April 28, 1970     N. G. WELSH     3,509,441
MOTOR BRAKING CIRCUIT
Filed May 11, 1967
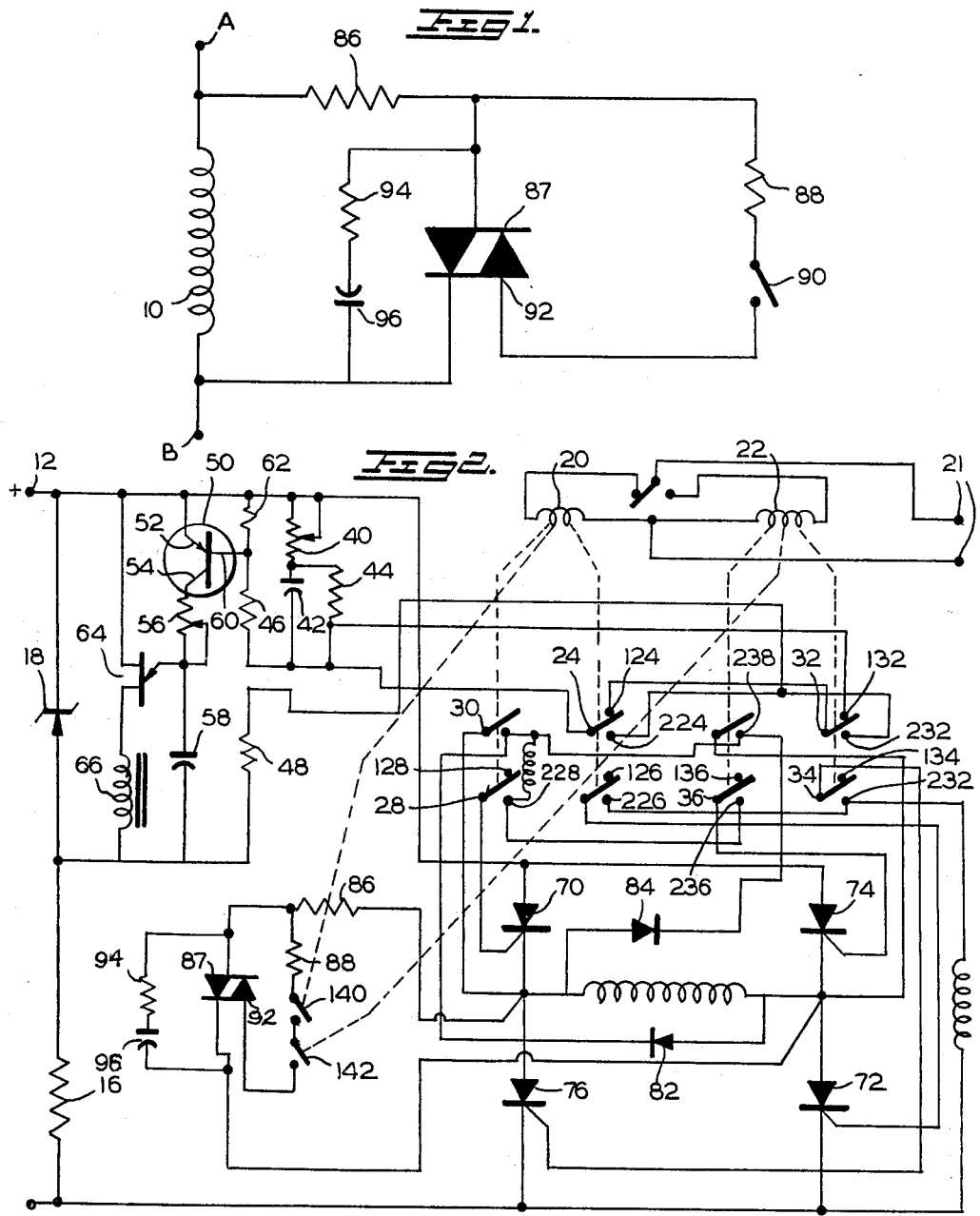
INVENTOR
NEWELL G. WELCH
BY
ATTORNEY

United States Patent Office 3,509,441
Patented Apr. 28, 1970

3,509,441
MOTOR BRAKING CIRCUIT
Newell G. Welch, Waynesboro, Va., assignor to Acme Visible Records, Inc., Crozet, Va., a corporation of Delaware
Filed May 11, 1967, Ser. No. 637,701
Int. Cl. H02k 27/20
U.S. Cl. 318—261      1 Claim

ABSTRACT OF THE DISCLOSURE

A motor braking circuit including a braking resistor in series with a normally non-conducting bilateral semiconductor switching device connected across a motor armature whereby the switching device may be energized by either a positive or negative gating signal to complete the braking circuit.

BACKGROUND OF THE INVENTION

Prior art motor control systems generally use unidirectional solid state control elements, such as silicon controlled rectifiers, which will block only one-half of an A.C. current source while controlling the other half. When full wave control is required, the current source must be rectified or two or more SCR's must be used. This results in expensive and complicated circuits.

Recently a bilateral semiconductor switching device has been developed, commonly known as a triac, which can be switched between a high and low impedance state so as to conduct current in both directions and give full wave power control of A.C. current. The triac is a semiconductor which includes at least three terminals. The main terminals are connected in the current carrying path of the circuit to be controlled, while a third gating or triggering terminal is coupled to a gating current source. When the device is off, it acts as a high impedance element and blocks current flow. When a gating current of either positive or negative polarity is introduced at the gating terminal, current flow is increased in the device and it is rendered conductive for both positive and negative current polarities.

SUMMARY OF THE INVENTION

The present invention relates to a motor control circuit and more particularly to a motor braking circuit utilizing a bilateral semiconductor switching device of the type described above.

A braking resistor shunted across the motor armature to be controlled is connected in series with a bilateral semiconductor switching device. A gating circuit includes a switching means to permit current from the armature to flow in the circuit to trigger the device. Since it is a bidirectional device, it is triggered into conduction by either a positive or negative signal so that regardless of the polarity of the motor armature, the motor braking circuit is energized.

Among the objects of the present invention are the provision of a motor braking circuit wherein the circuit is adapted to be energized regardless of the polarity of the current flow in the system; the provision of a motor braking circuit wherein a braking resistor is applied across the motor armature regardless of the polarity of the current flowing in the armature; the provision of a motor braking circuit wherein a bilateral switching device is adapted to be triggered into a conducting state to apply a braking resistor across a motor armature; and the provision of a motor braking circuit wherein a bilateral switching device is rendered conductive to apply a braking resistor to a motor armature only until the energy stored in the armature is depeted.

Other objects and further scope of applicability of the present invention will become apparent from the detailed description to follow, taken in conjunction with the accompanying drawings.

BRIEF DESCRIPTION OF THE DRAWINGS

FIGURE 1 is a schematic diagram of the circuit of the present invention; and

FIGURE 2 is a schematic diagram showing the circuit of FIGURE 1 utilized in a motor control circuit.

DESCRIPTION OF THE PREFERRED EMBODIMENTS

The motor braking circuit is illustrated in FIGURE 1. A motor armature 10 is connected to terminals A and B which are in turn connected to a conventional motor control circuit (not shown) adapted to provide power to drive the motor armature 10 in either a clockwise or a counterclockwise direction. A braking resistor 86, in series with a triac 87, is connected in parallel across the armature 10. A triac gating circuit is formed of a resistor 88 in series with a switch 90 which is connected from terminal A through the braking resistor 86 to a gate terminal 92 of the triac 87. A resistor 94 and a capacitor 96 are connected in series across the triac 87.

In operation, when the motor is shunt down, the switch 90 is in its closed position thereby completing the gating circuit to the triac gate terminal 92. The energy stored in the armature 10 is applied to the gate terminal 92 to trigger the triac 87 into its conducting state. Since the triac 87 is a bilateral device it can be triggered into conduction with either a positive or negative current across the armature 10. With the triac 87 conducting, it effectively becomes a short circuit and the braking resistor 86 is placed in shunt across the motor armature 10 to dissipate the energy stored therein and bring the motor to a halt. After the stored energy is depleted in the armature 10, the triac 87 is returned to its non-conducting state.

FIGURE 2 illustrates a motor control circuit which is similar, except for the motor braking circuit, to the motor control circuit illustrated and described in detail in my copending application, Motor Control Circuit, Ser. No. 622,531, filed Mar. 13, 1967. The braking circuit of the present invention, as described with reference to FIGURE 1, is shown connected across the motor armature 10. A triac 87 is placed in series with the braking resistor 86 which are in turn connected in parallel across the motor armature 10. A trigger resistor 88, in series with a contact 140 of relay 20 and a contact 142 of relay 22, is connected to the triac gate terminal 92.

Contacts 140 and 142 are normally closed. Energizing relay 20 or relay 22 completes the motor control circuit to apply power to the armature 10 thereby energizing the motor as described in the aforementioned application. The contact 140 of relay 20 or contact 142 of relay 22 opens thereby removing the gating signal from the triac 87. The triac 87 is rendered non-conductive, which effectively causes an open circuit at that point to remove the braking resistor 88 from the armature 10. When the motor control circuit is de-energized by de-energizing relay 20 or relay 22, its contact 140 or contact 142 again closes to close the gating circuit and a gate signal is applied to the gating terminal 92 of the triac 87. With the triac 87 in its conducting state, the braking resistor 86 is again applied across the motor armature 10 as described above with reference to FIGURE 1.

The braking circuit is not limited to the circuit described above but may be used in any motor control circuit having both a positive and negative polarity to provide automatic, arcless, electronic braking.

It will be appreciated that the above description is illustrative only and not limiting and that many modifications may be made to the specific embodiment described above without departing from the spirit and scope of the invention, which is defined in the appended claim.

What is claimed is:

1. A motor control system for dynamically braking a D.C. motor comprising a D.C. motor having an armature winding, a source of bidirectional electric power including a pair of conductors for carrying a D.C. potential, a bridge circuit comprising a SCR in each leg of said bridge circuit, said armature being connected across the diagonals of said bridge circuit, opposite pairs of said SCR's being adapted to permit current flow in opposite directions through said bridge and motor armature, first gating circuit adapted to render one of said pairs of SCR's conducting in a first direction second gating circuit being adapted to render a second of said pairs of SCR's conducting in a second direction to energize said motor, and a dynamic braking circuit for braking said motor comprising a braking resistor adapted to be placed in parallel across said motor armature to dissipate the energy stored therein, a bilateral switching device adapted to conduct current flowing through said armature in either of said directions and a third gating circuit to trigger said bilateral switching device into conduction, said third gating circuit including switching means to close said gating circuit in response to deenergization of said motor, including, a first relay switching means adapted to control said first pair of SCR's and a second relay switching means adapted to control said second pair of SCR's and wherein said switching means in said third gating comprises a first normally closed switching contact operably associated with said first relay switching means and a second normally closed switching contact operably associated with said second relay switching means, either one of said first or second switching contacts being open when said motor is running maintaining said third gating circuit open when either of said first or second relay switching means are energized.

References Cited

UNITED STATES PATENTS

| 3,017,555 | 1/1962 | Newman et al. | 318—380 |
|---|---|---|---|
| 3,188,547 | 6/1965 | Zelina | 318—380 |
| 3,328,606 | 6/1967 | Pinckaers. | |
| 3,398,343 | 8/1968 | Plumpe | 318—212 |
| 3,365,642 | 1/1968 | Risber | 318—376 |
| 3,395,334 | 7/1968 | Stein | 323—22 |
| 3,403,314 | 9/1968 | Maynard | 318—345 |
| 3,421,063 | 1/1969 | Reinke | 318—227 |
| 2,605,454 | 2/1949 | Grepe | 318—380 |
| 3,273,018 | 9/1966 | Goldberg | 317—20 |
| 3,286,148 | 11/1966 | Henderson | 318—211 |

FOREIGN PATENTS 945,249  12/1963  Great Britain.

ORIS L. RADER, Primary Examiner

K. L. CROSSON, Assistant Examiner

U.S. Cl. X.R.

318—280, 341; 321—45; 323—24